UNITED STATES PATENT OFFICE.

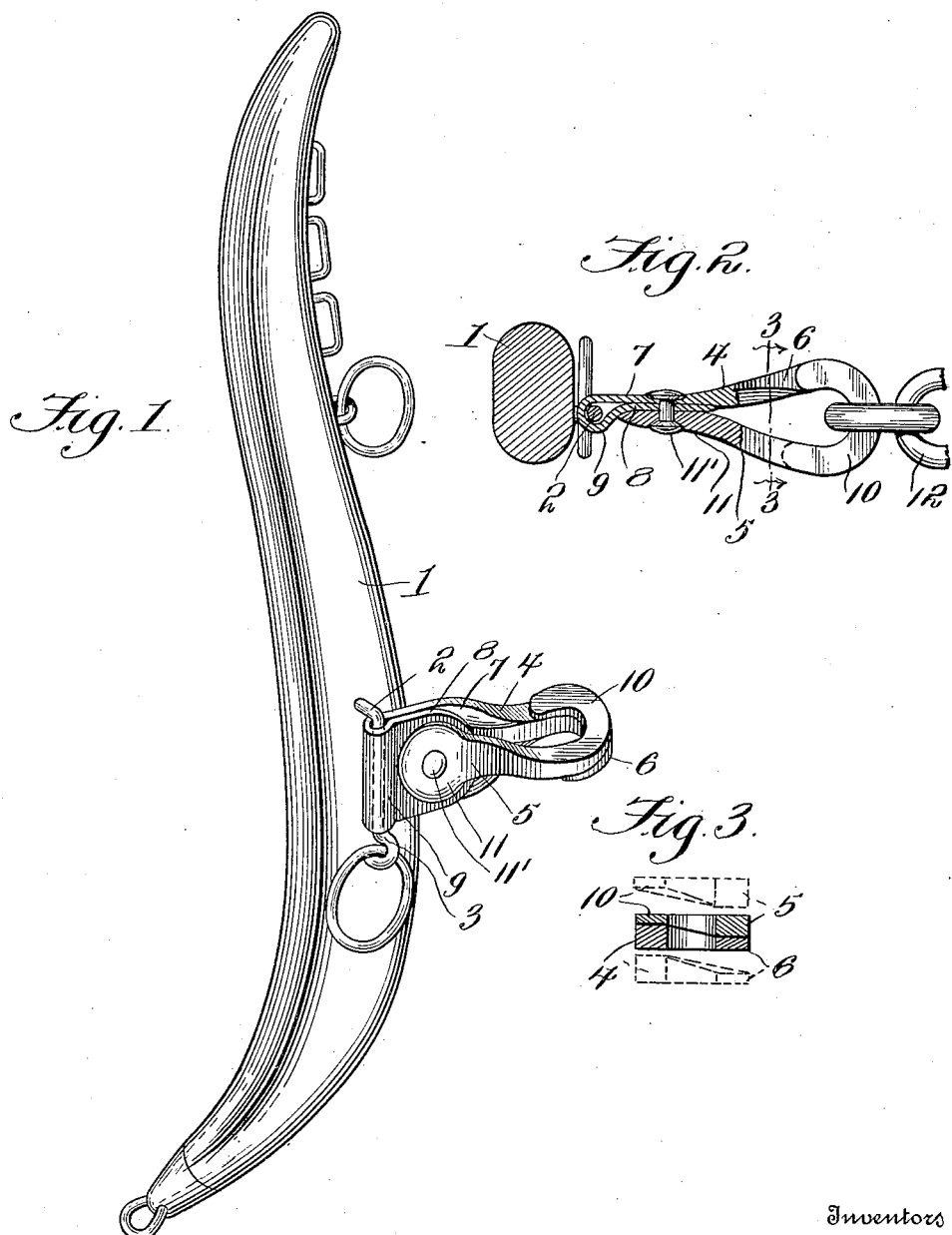

JAMES T. WALKER AND ANDREW C. JONES, OF PINOLA, MISSISSIPPI.

LAP-LINK LOGGERHEAD-HOOK.

1,084,983.　　　　　　Specification of Letters Patent.　　Patented Jan. 20, 1914.

Application filed March 8, 1913.　Serial No. 752,946.

*To all whom it may concern:*

Be it known that we, JAMES T. WALKER and ANDREW C. JONES, citizens of the United States, residing at Pinola, in the county of Simpson and State of Mississippi, have invented new and useful Improvements in Lap-Link Loggerhead-Hooks, of which the following is a specification.

This invention relates to lap-link logger head hooks designed particularly for use in connecting chain and other traces to draft hames employed in logging and other similar operations, or for any other draft purpose.

The object of the invention is to provide a lap-link which will facilitate the connection and disconnection of the trace from the hame, which will permit the links of a trace chain to be taken up or detached in a ready and convenient manner, which will hold the trace firmly against any possibility of disconnection, and which is strong and durable and may be inexpensively manufactured.

The invention consists of the features of construction, combination and arrangement of parts hereinafter fully described and claimed, reference being had to the accompanying drawings, in which—

Figure 1 is a view of a hame showing the application of our improved lap-link thereto. Fig. 2 is a section taken transversely through the hame and longitudinally through the link. Fig. 3 is a transverse section through the link on the line 3—3 of Fig. 2.

Referring to the drawing, 1 designates a draft hame of any suitable construction, to which is applied a staple 2, formed of wire or other suitable material and constituting a hinge member. This staple is offset adjacent one end thereof to provide a stop shoulder 3.

The improved lap-link comprises a pair of hook members 4 and 5. The member 4 consists of a substantially flat hook proper 6, carried by a comparatively broad flat shank 7. This shank is integral with a leaf 8, which is bent backwardly upon the shank to lie in snug engagement therewith, the shank and leaf being properly formed at their point of juncture to provide a loop or knuckle 9 to engage the staple 2, whereby the lap-link is hingedly or pivotally connected therewith.

The hook member 5 comprises a flattened hook proper 10, carried by a broad flattened shank 11, which is arranged to bear against the outer side of the folded member or leaf of the hook member 4. A rivet 11 passes through the shanks of the members 4 and 5 and also through the leaf, and unites the leaf of the shank to the member 4, and forms a pivotal support for the hook member 5, whereby the hook members 4 and 5 may be relatively opened and closed.

It will be observed that the shoulder 3 holds the lap-link against sliding movement and displacement on the hame, while the shank of the member 4 provides a broad abutting surface to bear against the hame, thus affording a strong and durable connection, as well as an enlarged bearing surface to enable the link to withstand the strains imposed thereon. When the link members are closed the hooks lie in engagement, and are so held under the pulling strain on the link of the chain trace 12 engaged therewith, by which accidental opening of the lap-link is effectually prevented. It will, of course, be understood that the link or connecting member of the trace chain must be applied to and removed from the lap-link at an angle, so that a secure connection at all times is afforded. The hinged or pivotal connection between the lap-link and hame permits the link to readily adjust itself under the movement of the trace, as will be readily understood, and also enables said lap-link to be moved to a convenient position for the application and removal of the trace.

The improved link above described is simple of construction, may be made of any tough and durable metal, and is adapted to be manufactured and sold at a comparatively low cost. It will positively hold the trace from disconnection, while permitting of its ready attachment and detachment when occasion requires. It will also permit of any slack in a trace chain being readily taken up, and of the free links of the trace hanging on the outside of the trace, where they will not rub or otherwise injure the horse.

We claim:—

A lap-link comprising a hook member having a shank provided with a portion bent back upon itself to form a knuckle, the sides of the knuckle forming portions of the shank lying approximately within the plane of the shank, a second hook member provided with a shank resting against said bent portion of the first-named hook member, and a pin or rivet passing through the shank of the hook members and folded portion of the first-named member and uniting the shank and folded portion of the first-named member and pivotally connecting the second-named member therewith, the loop of the knuckle being off set from the plane of the shank of the first-named hook member to lie axially in a plane between the shanks.

In testimony whereof we affix our signatures in presence of two witnesses.

JAMES T. WALKER.
ANDREW C. JONES.

Witnesses:
BEE KING,
L. B. DURR.

Copies of this patent may be obtained for five cents each, by addressing the "Commissioner of Patents, Washington, D. C."